US012483784B2

(12) United States Patent
Fang et al.

(10) Patent No.: US 12,483,784 B2
(45) Date of Patent: Nov. 25, 2025

(54) APPARATUS FOR QUICKLY FINDING PLANET BY USING MOBILE PHONE

(71) Applicant: Beaver Technology (Shenzhen) Co., Ltd., Shenzhen (CN)

(72) Inventors: Hongfei Fang, Shenzhen (CN); Wei Wang, Shenzhen (CN); Han Chen, Shenzhen (CN); Qi'en Wu, Shenzhen (CN); Chenxi Zeng, Shenzhen (CN); Huanzheng Zheng, Shenzhen (CN)

(73) Assignee: Beaver Technology (Shenzhen) Co., Ltd., Shenzhen (CN)

( * ) Notice: Subject to any disclaimer, the term of this patent is extended or adjusted under 35 U.S.C. 154(b) by 54 days.

(21) Appl. No.: 18/592,804

(22) Filed: Mar. 1, 2024

(65) Prior Publication Data
US 2025/0254418 A1 Aug. 7, 2025

(30) Foreign Application Priority Data
Feb. 1, 2024 (CN) .......................... 202410157884.5

(51) Int. Cl.
| | |
|---|---|
| *H04N 23/661* | (2023.01) |
| *G06V 10/75* | (2022.01) |
| *G06V 20/60* | (2022.01) |
| *H04N 23/61* | (2023.01) |
| *H04N 23/67* | (2023.01) |
| *H04N 23/695* | (2023.01) |
| *G02B 23/16* | (2006.01) |

(52) U.S. Cl.
CPC ........... *H04N 23/661* (2023.01); *G06V 10/75* (2022.01); *G06V 20/60* (2022.01); *H04N 23/61* (2023.01); *H04N 23/67* (2023.01); *H04N 23/695* (2023.01); *G02B 23/16* (2013.01)

(58) Field of Classification Search
CPC ...... H04N 23/61; H04N 23/67; H04N 23/695; G02B 23/16
See application file for complete search history.

(56) References Cited

U.S. PATENT DOCUMENTS

| | | | | |
|---|---|---|---|---|
| 2006/0238860 A1* | 10/2006 | Baun | ....................... | G02B 23/16 |
| | | | | 359/429 |
| 2016/0124210 A1* | 5/2016 | Ross | ....................... | G02B 23/18 |
| | | | | 359/399 |
| 2016/0337574 A1* | 11/2016 | Chen | ....................... | H04N 23/67 |

FOREIGN PATENT DOCUMENTS

| | | |
|---|---|---|
| CN | 106405255 A | 2/2017 |
| CN | 111026167 A | 4/2020 |

(Continued)

OTHER PUBLICATIONS

Villa (NPL "Autonomous Navigation and Dense Shape Reconstruction Using Stereophotogrammetry at Small Celestial Bodies," AAS 2022) (2022).*

*Primary Examiner* — Shadan E Haghani

(57) ABSTRACT

The present invention discloses an apparatus for quickly finding a planet by using a mobile phone, including: a digital telescope, an electronic compass, a pan/tilt configured to install the digital telescope, a mobile phone, a PC terminal, and a data converter. The digital telescope includes a telescope housing. A main camera configured to photograph target starry sky and a planet-finding camera configured to search for and photograph a target planet are disposed at one end that is of the telescope housing and that faces starry sky. The present invention is used more easily when a user's professional level is reduced.

3 Claims, 3 Drawing Sheets

(56) References Cited

FOREIGN PATENT DOCUMENTS

| | | | | |
|---|---|---|---|---|
| CN | 213186105 U | 5/2021 | | |
| CN | 113406786 A | * 9/2021 | ............. | G02B 23/16 |

* cited by examiner

APPARATUS FOR QUICKLY FINDING PLANET BY USING MOBILE PHONE

CROSS-REFERENCE TO RELATED APPLICATIONS

The application claims priority to Chinese patent application No. 2024101578845, filed on Feb. 1, 2024, the entire contents of which are incorporated herein by reference.

TECHNICAL FIELD

The present invention relates to the technical field of finding planets, and in particular, to an apparatus for quickly finding a planet by using a mobile phone.

BACKGROUND

When a traditional astronomical telescope is searching for a target celestial body, an astronomer or an enthusiast needs to manually adjust the telescope with some astronomical foundation and experience. In addition, for a traditional automatic planet-finding telescope, a user also needs to input accurate current time and location, and to find a specific calibration planet provided by the telescope, and the user needs to have some professional knowledge in advance, so that a planet-finding process is time-consuming and error-prone. Therefore, an apparatus for quickly finding a planet by using a mobile phone is provided.

SUMMARY

The present invention is mainly intended to provide an apparatus for quickly finding a planet by using a mobile phone, which can resolve the problem in the background.

To achieve the foregoing purpose, technical solutions used in the present invention are as follows.

An apparatus for quickly finding a planet by using a mobile phone is provided, including: a digital telescope, an electronic compass, a pan/tilt for configured to install the digital telescope and adjust an orientation thereof, a mobile phone, a PC terminal, and a data converter. The digital telescope includes a telescope housing. A main camera configured to photograph target starry sky and a planet-finding camera configured to search for and photograph a target planet are disposed at one end that is of the telescope housing and that faces starry sky. The electronic compass is installed at one end that is of the telescope housing and that is away from the starry sky. A focus motor configured to focus the main camera and a focus driver configured to control operation of the focus motor are further disposed in the telescope housing. The pan/tilt includes a tripod base, an upper end of the tripod base is rotatably connected to a Z-axis revolving base, a Z-axis motor that is configured to drive the Z-axis revolving base to rotate around a Z-axis at an upper end of the tripod base is installed between the Z-axis revolving base and the tripod base. An installing base is rotatably disposed on a side wall of the Z-axis revolving base, the digital telescope is firmly connected to one end that is of the installing base and that is away from the Z-axis revolving base, and an X-axis motor configured to drive the installing base to rotate around an X-axis is installed on the Z-axis revolving base. An image digital signal processor configured to drive operation of the focus driver and process a real-time starry sky image obtained through photographing by the main camera and a real-time planet image obtained through photographing by the planet-finding camera. The image digital signal processor is connected to an APP on the mobile phone through WiFi and the data converter. The X-axis motor and the Z-axis motor are both controlled by the image digital signal processor, so that an azimuth angle and a pitch angle of the digital telescope are adjusted, and the electronic compass is connected to the image digital signal processor.

Preferably, a historical planet map of the target starry sky and planet positioning data of the target planet are built in the APP on the mobile phone. The main camera sends the real-time starry sky image of the photographed target starry sky to the image digital signal processor in the form of an analog digital signal, to be processed by the image digital signal processor. Preferably, the image digital signal processor compares the real-time starry sky image with the historical planet map, when the real-time starry sky image is not corresponding to the historical planet map, operation of the X-axis motor and the Z-axis motor is controlled, the azimuth angle and pitch angle of the digital telescope are adjusted, and focusing of the main camera is controlled by using the focus driver and the focus motor, so that the real-time starry sky image of the target starry sky photographed by the main camera is corresponding to the historical planet map.

Preferably, when the real-time starry sky image of the target starry sky photographed by the main camera is corresponding to the historical planet map, a user may send the planet positioning data of the target planet to the image digital signal processor through the APP on the mobile phone. After receiving data information, the image digital signal processor controls the planet-finding camera to search for a target planet that matches the planet positioning data in a starry sky area photographed by the main camera, and controls the planet-finding camera to photograph the target planet, to obtain a real-time planet image of the target planet. The planet-finding camera sends the real-time planet image obtained through photographing to the image digital signal processor in the form of the analog digital signal.

Preferably, a random access memory and an embedded memory that are connected to the image digital signal processor, and a USB interface, a battery, a DC-DC switching power supply, a low dropout linear regulator, and an LED indicator light are further disposed in the telescope housing. The USB interface may be used for performing charging or connected to the PC terminal, so that the user can import the real-time starry sky image and the real-time planet image to the PC terminal.

Preferably, the electronic compass records the azimuth angle and pitch angle of the digital telescope in real time during adjustment of the azimuth angle and pitch angle of the digital telescope and during photographing by the digital telescope, and real-time data of the azimuth angle and pitch angle is sent to the data converter by using the image digital signal processor and displayed on the APP on the mobile phone.

Preferably, a switch for start/stop is also disposed on the telescope housing.

Compared with the conventional technologies, the present invention has the following beneficial effects.

1. Operation of the X-axis motor and the Z-axis motor is controlled by using the image digital signal processor, the azimuth angle and pitch angle of the digital telescope are adjusted, and focusing of the main camera is controlled by using the focus driver and the focus motor, so that the real-time starry sky image of the target starry sky can be photographed. The electronic compass records the azimuth angle and pitch angle of the digital telescope in real time during adjustment of the azimuth angle and pitch angle of the digital telescope and during photographing by the digital telescope, and real-time data of the azimuth angle and pitch angle is sent to the data converter by using the image digital signal processor and displayed on the APP on the mobile phone, which is easy to use.

2. Through connection to the APP on the mobile phone, the historical planet map of the target starry sky and the planet positioning data of the target planet are built in the APP on the mobile phone. The main camera sends the real-time starry sky image of the photographed target starry sky to the image digital signal processor, and the image digital signal processor compares the real-time starry sky image with the historical planet map. When the real-time starry sky image is not corresponding to the historical planet map, the image digital signal processor controls operation of the X-axis motor and the Z-axis motor, to adjust the azimuth angle and the pitch angle of the digital telescope, and the digital telescope is focused, so that quick adjustment and focusing of the azimuth angle and the pitch angle of the digital telescope can be automatically implemented, and the apparatus for quickly finding a planet by using a mobile phone is used more easily when a user's professional level is reduced. When the real-time starry sky image of the target starry sky photographed by the main camera is corresponding to the historical planet map, a user may send planet positioning data of a target planet to the image digital signal processor through the APP on the mobile phone. After receiving data information, the image digital signal processor controls the planet-finding camera to search for a target planet that matches the planet positioning data in a starry sky area photographed by the main camera, and controls the planet-finding camera to photograph the target planet, to obtain a real-time planet image of the target planet, so that a planet to be photographed can be found quickly, which is easy to use.

Figure 1:
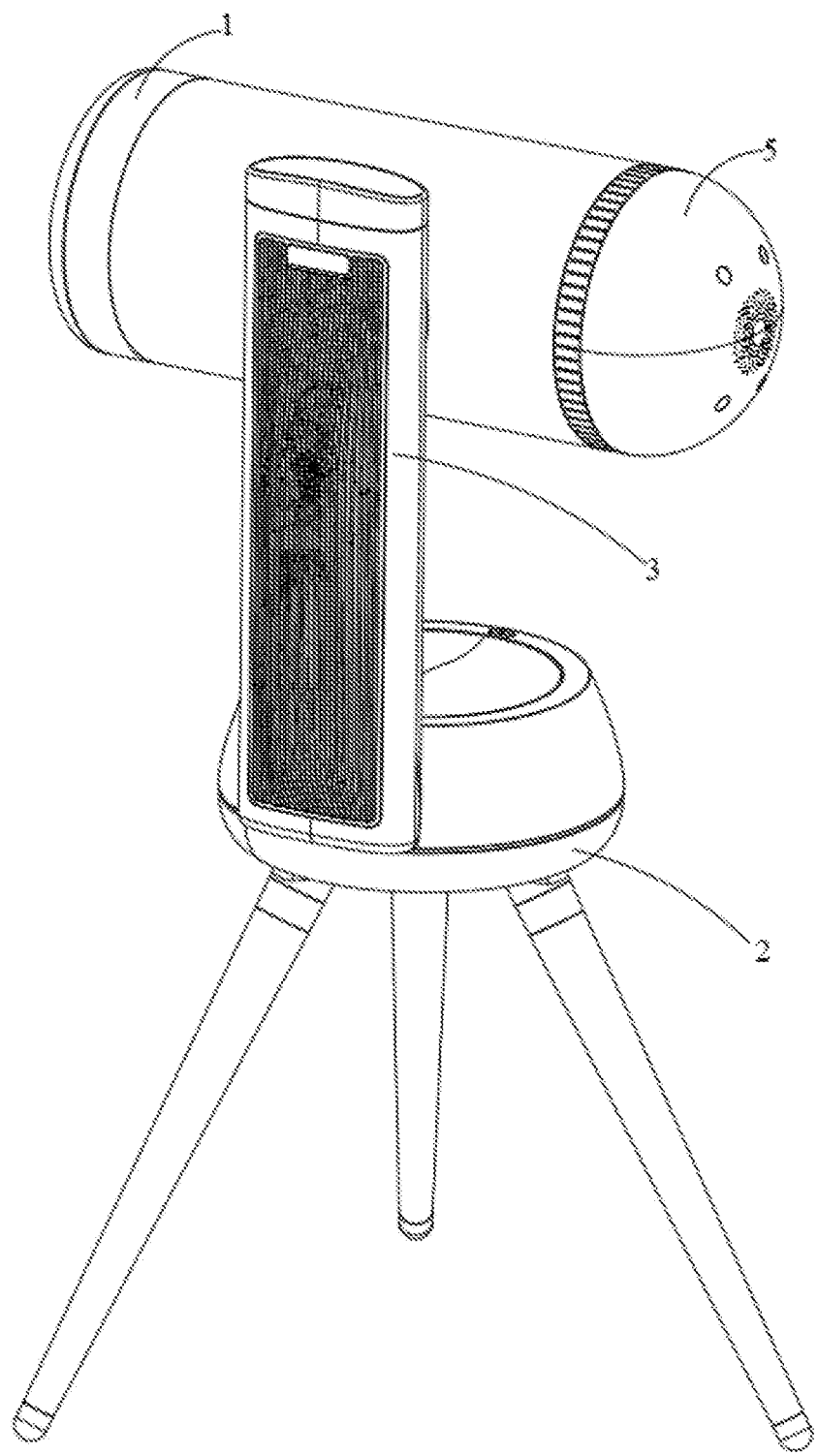
FIG. 1 is an overall structural diagram of an apparatus for quickly finding a planet by using a mobile phone according to the present invention.

In the drawings: 1. digital telescope; 2. tripod base; 3. Z-axis revolving base; 31. installing base; 5. electronic compass; 6. X-axis motor; 7. Z-axis motor; 8. mobile phone; 9. PC terminal; 11. image digital signal processor; 12. switch; 13. main camera; 14. planet-finding camera; 15. focus driver; 16. focus motor; 17. embedded memory; 18. random access memory; 19. USB interface; 20. battery; 21. DC-DC switching power supply; 22. low dropout linear regulator; 23. LED indicator light; 24. data converter.

DETAILED DESCRIPTION OF THE EMBODIMENTS

To make technical means, creation features, objectives, and effects achieved by the present invention easy to understand, the present invention is further described below with reference to specific implementations.

In the descriptions of the present invention, it should be noted that an orientation or a position relationship indicated by a term "upper", "lower", "inner", "outer", "front end", "back end", "both ends", "one end", "the other end" or the like is based on an orientation or a position relationship shown in the accompanying drawings, and is merely intended for ease of describing the present invention and simplifying description, but does not indicate or imply that a described apparatus or element needs to have a specific orientation or be constructed and operated in a specific orientation. Therefore, such term shall not be understood as a limitation on the present invention. In addition, the terms "first" and "second" are merely intended for a purpose of description, and shall not be understood as an indication or implication of relative importance.

In the description of the present invention, it should be noted that, unless otherwise expressly stipulated and defined, terms "install", "dispose", "connect", and the like should be understood in a broad sense. For example, "connection" may be a firm connection, a detachable connection, or an integral connection; may be a mechanical connection, or an electrical connection; or may be a direct connection, an indirect connection through an intermediate medium, or a connection between two elements. A person of ordinary skill in the art can understand specific meanings of these terms in the present invention based on specific situations.

Figure 2:
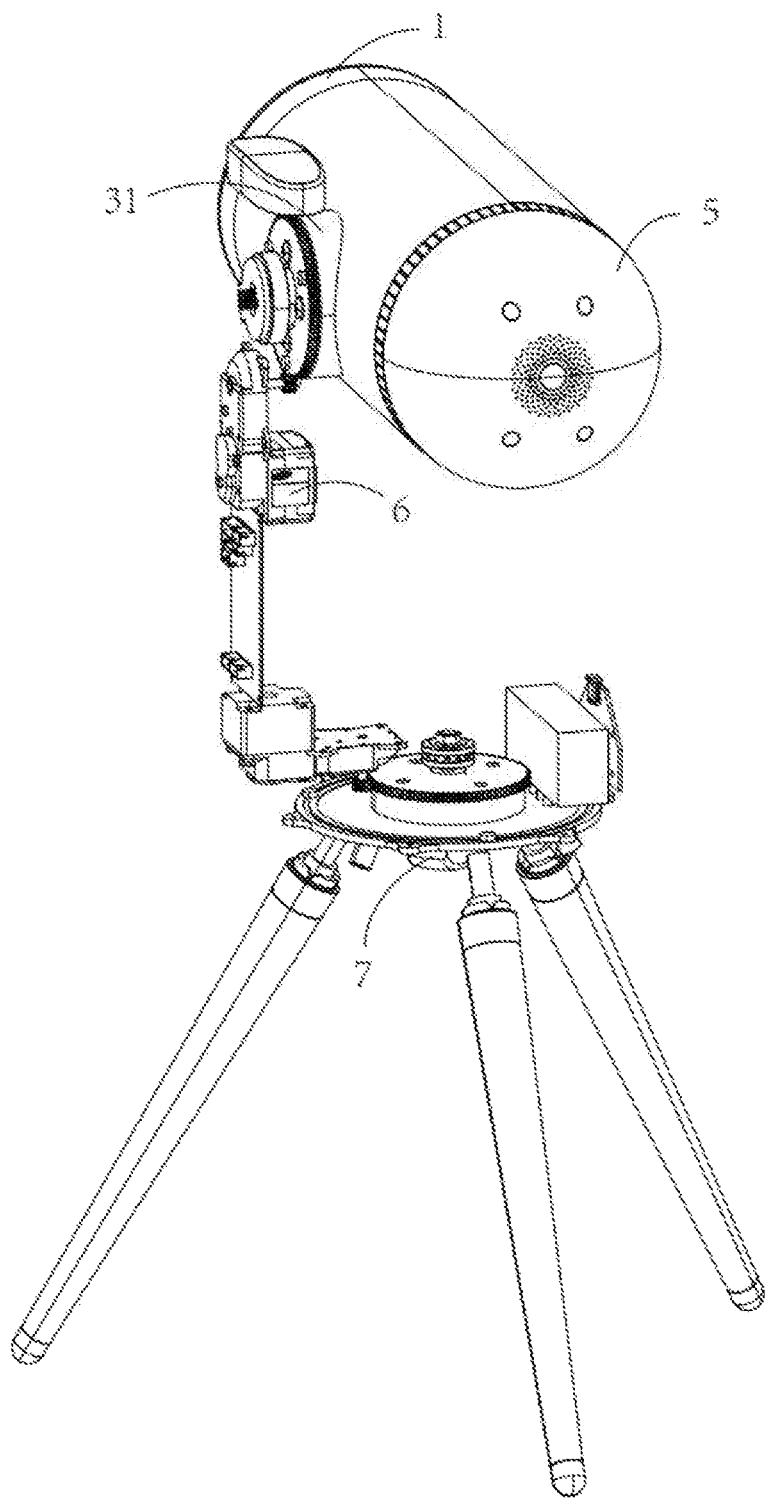
FIG. 2 is an inner structural diagram of an apparatus for quickly finding a planet by using a mobile phone according to the present invention.
Figure 3:
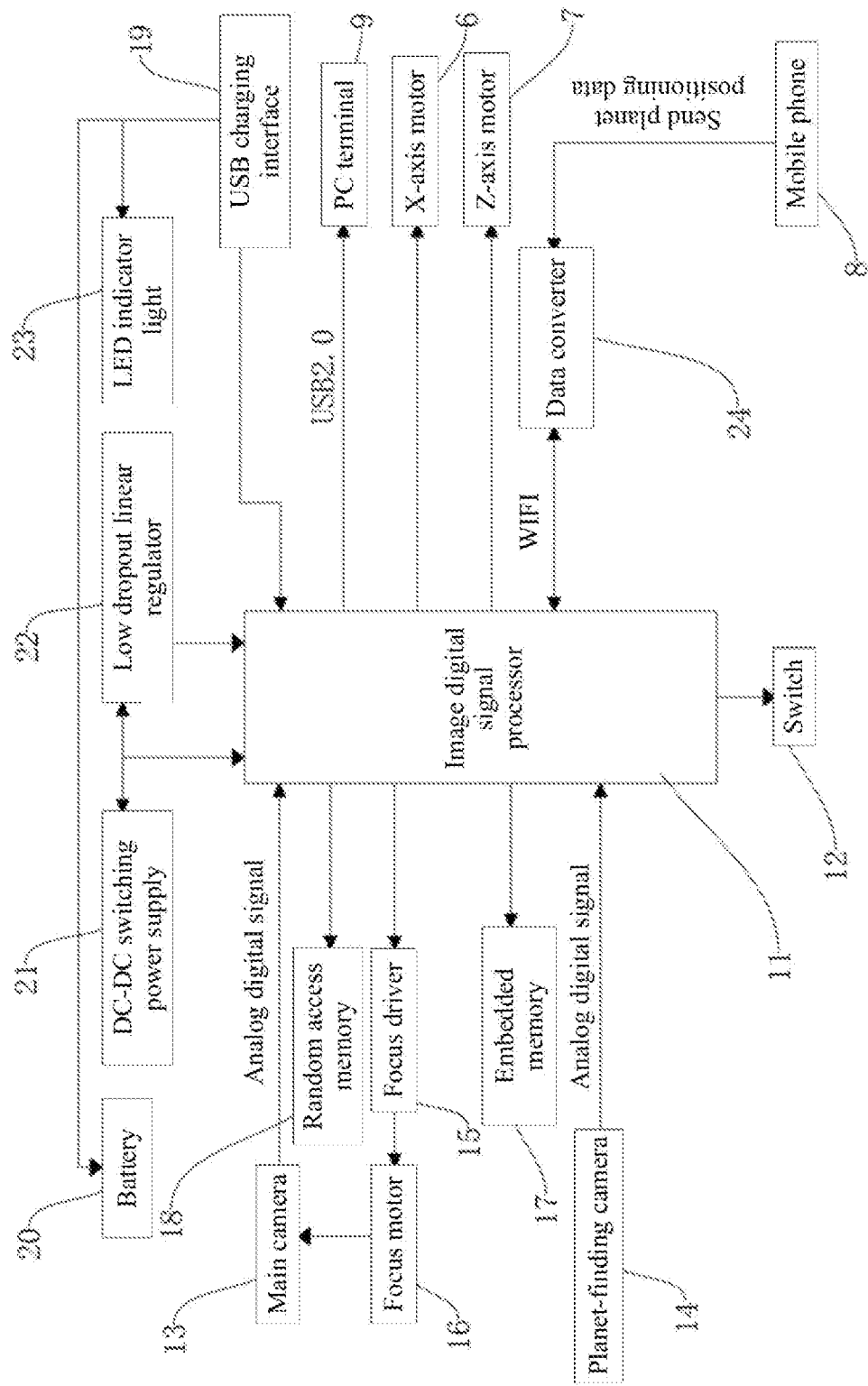
FIG. 3 is a structural block diagram of an apparatus for quickly finding a planet by using a mobile phone according to the present invention.

As shown in FIG. 1 to FIG. 3, an apparatus for quickly finding a planet by using a mobile phone includes a digital telescope 1, an electronic compass 5, a pan/tilt configured to install the digital telescope 1 and adjust an orientation thereof, a mobile phone 8, a PC terminal 9, and a data converter 24. The digital telescope 1 includes a telescope housing. A main camera 13 configured to photograph target starry sky and a planet-finding camera 14 configured to search for and photograph a target planet are disposed at one end that is of the telescope housing and that faces starry sky. The electronic compass 5 is installed at one end that is of the telescope housing and that is away from the starry sky. A focus motor 16 configured to focus the main camera 13 and a focus driver 15 configured to control operation of the focus motor 16 are further disposed in the telescope housing. The pan/tilt includes a tripod base 2. An upper end of the tripod base 2 is rotatably connected to a Z-axis revolving base 3. A Z-axis motor 7 that is configured to drive the Z-axis revolving base 3 to rotate around a Z-axis at an upper end of the tripod base 2 is installed between the Z-axis revolving base 3 and the tripod base 2. An installing base 31 is rotatably disposed on a side wall of the Z-axis revolving base 3. The digital telescope 1 is firmly connected to one end that is of the installing base 31 and that is away from the Z-axis revolving base 3. An X-axis motor 6 configured to drive the installing base 31 to rotate around an X-axis is installed on the Z-axis revolving base 3. An image digital signal processor 11 configured to drive operation of the focus driver 15 and process a real-time starry sky image obtained through photographing by the main camera 13 and a real-time planet image obtained through photographing by the planet-finding camera 14 is further disposed in the telescope housing. The image digital signal processor 11 is connected to an APP on the mobile phone 8 through WiFi and the data converter 24. The X-axis motor 6 and the Z-axis motor 7 are both controlled by the image digital signal processor 11, to adjust an azimuth angle and a pitch angle of the digital telescope 1. The electronic compass 5 is connected to the image digital signal processor 11.

A historical planet map of the target starry sky and planet positioning data of the target planet are built in the APP on the mobile phone 8. The main camera 13 sends the real-time starry sky image of the photographed target starry sky to the image digital signal processor 11 in the form of an analog digital signal, to be processed by the image digital signal processor 11. The image digital signal processor 11 compares the real-time starry sky image with the historical planet map. When the real-time starry sky image is not corresponding to the historical planet map, operation of the X-axis motor 6 and the Z-axis motor 7 is controlled, the azimuth angle and pitch angle of the digital telescope 1 are adjusted, and focusing of the main camera 13 is controlled by using the focus driver 15 and the focus motor 16, so that the real-time starry sky image of the target starry sky photographed by the main camera 13 is corresponding to the historical planet map.

The real-time starry sky image of the target starry sky photographed by the main camera 13 is corresponding to the historical planet map. A user may send the planet positioning data of the target planet to the image digital signal processor 11 through the APP on the mobile phone 8. After receiving data information, the image digital signal processor 11 controls the planet-finding camera 14 to search for a target planet that matches the planet positioning data in a starry sky area photographed by the main camera 13, and controls the planet-finding camera 14 to photograph the target planet, to obtain a real-time planet image of the target planet. The planet-finding camera 14 sends the real-time planet image obtained through photographing to the image digital signal processor 11 in the form of the analog digital signal.

A random access memory 18 and an embedded memory 17 connected to the image digital signal processor 11 are further disposed in the telescope housing. The random access memory 18 and the embedded memory 17 are used for data storage, and a USB interface 19, a battery 20, a DC-DC switching power supply 21, a low dropout linear regulator 22, and an LED indicator light 23 are provided. The USB interface 19 may be used for performing charging or connected to the PC terminal 9, so that the user can import the real-time starry sky image and the real-time planet image to the PC terminal 9. When charging is performed through the USB interface 19, the LED indicator light 23 lights up, and the battery 20 stores energy, so that the apparatus may be used normally without an external power supply.

The electronic compass 5 records the azimuth angle and pitch angle of the digital telescope 1 in real time during adjustment of the azimuth angle and pitch angle of the digital telescope 1 and during photographing by the digital telescope 1, and real-time data of the azimuth angle and pitch angle is sent to the data converter 24 by using the image digital signal processor 11 and displayed on the APP on the mobile phone 8.

A switch 12 for start/stop is also disposed on the telescope housing.

Basic principles and main features of the present invention and advantages of the present invention are shown and described above. A person skilled in the art should understand that the present invention is not limited by the foregoing embodiments. The foregoing embodiments and specifications only illustrate the principles of the present invention. Without departing from the spirit and scope of the present invention, the present invention may also have various changes and modifications, which fall within the scope claimed to be protected in the present invention. The scope of protection of the present invention is defined by the appended claims and equivalents thereof.

What is claimed is:

1. An apparatus for finding a planet by using a mobile phone, comprising: a digital telescope, an electronic compass, a pan/tilt head configured to install the digital telescope and adjust an orientation thereof, a mobile phone, a PC terminal, and a data converter configured for converting data from the digital telescope to the mobile phone, wherein the digital telescope comprises a telescope housing, a main camera configured to photograph target starry sky and a planet-finding camera configured to search for and photograph a target planet are disposed at one end that is of the telescope housing and that faces starry sky, and the electronic compass is installed at one end that is of the telescope housing and that is away from the starry sky; a focus motor configured to focus the main camera and a focus driver configured to control operation of the focus motor are further disposed in the telescope housing; the pan/tilt head comprises a tripod base, an upper end of the tripod base is rotatably connected to a Z-axis revolving base, a Z-axis motor that is configured to drive the Z-axis revolving base to rotate around a Z-axis at the upper end of the tripod base is installed between the Z-axis revolving base and the tripod base, an installing base is rotatably disposed on a side wall of the Z-axis revolving base, the digital telescope is firmly connected to one end that is of the installing base and that is away from the Z-axis revolving base, and an X-axis motor configured to drive the installing base to rotate around an X-axis is installed on the Z-axis revolving base;

an image digital signal processor configured to drive operation of the focus driver and process a real-time starry sky image obtained through photographing by the main camera and a real-time planet image obtained through photographing by the planet-finding camera is further disposed in the telescope housing; the image digital signal processor is connected to an APP on the mobile phone through WiFi and the data converter; and the X-axis motor and the Z-axis motor are both controlled by the image digital signal processor, so that an azimuth angle and a pitch angle of the digital telescope are adjusted, and the electronic compass is connected to the image digital signal processor, wherein a historical planet map of the target starry sky and planet positioning data of the target planet are built in the APP on the mobile phone; the main camera sends the real-time starry sky image of the photographed target starry sky to the image digital signal processor in the form of an analog signal, to be processed by the image digital signal processor; and the image digital signal processor compares the real-time starry sky image with the historical planet map, when the real-time starry sky image is not corresponding to the historical planet map, operation of the X-axis motor and the Z-axis motor is controlled, the azimuth angle and pitch angle of the digital telescope are adjusted, and focusing of the main camera is controlled by using the focus driver and the focus motor, so that the real-time starry sky image of the target starry sky photographed by the main camera is corresponding to the historical planet map, wherein when the real-time starry sky image of the target starry sky photographed by the main camera is corresponding to the historical planet map, a user may send the planet positioning data of the target planet to the image digital signal processor through the APP on the mobile phone, after receiving data information, the image digital signal processor controls the planet-finding camera to search for a target planet that matches the planet positioning data in a starry sky area photographed by the main camera, and controls the planet-finding camera to photograph the target planet, to obtain a real-time planet image of the target planet; and the planet-finding camera sends the real-time planet image obtained through photographing to the image digital signal processor in the form of the analog signal, wherein a random access memory and an embedded memory that are connected to the image digital signal processor, and a USB interface, a battery, a DC-DC switching power supply, a low dropout linear regulator, and an LED indicator light are further disposed in the telescope housing, and the USB interface may be used for performing charging or connected to the PC terminal, so that the user can import the real-time starry sky image and the real-time planet image to the PC terminal.

2. The apparatus for finding a planet by using a mobile phone according to claim 1, wherein the electronic compass records the azimuth angle and pitch angle of the digital telescope in real time during adjustment of the azimuth angle and pitch angle of the digital telescope and during photographing by the digital telescope, and real-time data of the azimuth angle and pitch angle is sent to the data converter by using the image digital signal processor and displayed on the APP on the mobile phone.

3. The apparatus for finding a planet by using a mobile phone according to claim 2, wherein a switch for start/stop is also disposed on the telescope housing.

* * * * *